United States Patent [19]

Shibuya

[11] Patent Number: 5,666,662
[45] Date of Patent: Sep. 9, 1997

[54] METHOD FOR DETECTING THE LOCATION OF A MOBILE TERMINAL

[75] Inventor: Toshiyuki Shibuya, Tokyo, Japan

[73] Assignee: NEC Corporation, Japan

[21] Appl. No.: 278,516

[22] Filed: Jul. 21, 1994

[30] Foreign Application Priority Data

Jul. 23, 1993 [JP] Japan ..................... 5-202077

[51] Int. Cl.$^6$ ................. H04B 7/26; G01S 3/06
[52] U.S. Cl. ............. 455/456; 455/67.1; 342/457; 342/463
[58] Field of Search ............. 455/33.1, 53.1, 455/54.1, 54.2, 56.1, 67.1, 67.7; 342/450, 457, 463–465

[56] References Cited

U.S. PATENT DOCUMENTS

| 5,128,925 | 7/1992 | Dornstetter et al. ............ 455/56.1 |
| 5,208,756 | 5/1993 | Song ............................... 342/457 X |
| 5,513,243 | 4/1996 | Kage ............................... 455/56.1 |

FOREIGN PATENT DOCUMENTS

| 133378 | 2/1985 | European Pat. Off. . |
| 2-285730 | 11/1990 | Japan . |
| 3-117225 | 5/1991 | Japan . |
| 92/05672 | 4/1992 | WIPO . |
| 92/13284 | 8/1992 | WIPO . |

Primary Examiner—Chi H. Pham
Attorney, Agent, or Firm—Ostrolenk, Faber, Gerb & Soffen, LLP

[57] ABSTRACT

In location detection of a mobile terminal, a location inquiry signal is transmitted from one or more base stations to the mobile terminal at predetermined intervals. In response to the location inquiry signal, the mobile terminal transmits a location signal including its identification information such as a telephone number. The location signal is received by at least three base stations neighboring to the mobile terminal. The respective distances from that base stations to the mobile terminal are calculated based on the respective field strength values of the location signal received by the base stations, and the location of the mobile terminal is detected based on the calculated distances. More specifically, the location is calculated as an intersection of the respective circles defined by radiuses of the calculated distances from the base stations receiving the location signal.

8 Claims, 5 Drawing Sheets

LOCATION DETECTION

METHOD FOR DETECTING THE LOCATION OF A MOBILE TERMINAL

BACKGROUND OF THE INVENTION

1. Field of the Invention

The present invention relates to a mobile radio communication system and, more particularly, to a method of detecting the location of radio terminal equipment such as a portable telephone set.

2. Description of the Prior Art

Recently, small and light-weight portable telephone sets have been developed and widely used. Since such a portable apparatus is designed to be transported easily from one location to another, in some cases, it is very important to detect where it is located. Accordingly, there have been proposed a variety of ways to detect the location of a portable telephone set.

A conventional method is disclosed in Japanese Patent Unexamined Publication No. Hei 2-285730. The method is to specify the location of a portable telephone set depending on which one of receivers each having a certain location has received a predetermined radio wave from the portable telephone set.

Another conventional method is disclosed in Japanese Patent Unexamined Publication No. Hei 3-117225. In this method, a searcher having a directional antenna is used to receive a radio signal from a pocket bell while moving, the searcher specifies the location of the pocket bell.

However, in the first conventional method, location detection is made by the receiver that has received the radio wave from a portable telephone set, so a large number of receivers must be installed to increase the accuracy of detection. Therefore, this conventional method can be applied only to a limited area such as a room.

Also, in the second conventional method, since a pocket bell emitting a radio signal is searched for by means of the searcher having the directional antenna, the searcher must be moved while the direction of the directional antenna is being changed or, alternatively, a plurality of searchers are required. Therefore, this conventional method cannot be applied to a wide service area.

It is, accordingly, an object of the present invention to provide a method of detecting the location of a mobile terminal without reducing advantages of mobile communication services available in a wide area.

It is another object of the present invention to provide a method capable of specifying the location of a mobile terminal as well as tracing it.

SUMMARY OF THE INVENTION

In location detection of a mobile terminal (e.g. a portable telephone set) according to the present invention in a mobile radio communication system comprising a plurality of base stations, a location inquiry signal is transmitted from one or more base stations to the mobile terminal at predetermined intervals. In response to the location inquiry signal, the mobile terminal transmits a location signal including its identification information such as a telephone number. The location signal is received by at least three base stations neighboring to the mobile terminal. The respective distances from that base stations to the mobile terminal are calculated based on the respective field strength values of the location signal received by the base stations, and the location of the mobile terminal is detected based on the calculated distances. More specifically, the location of the mobile terminal is calculated as an intersection of the respective circles defined by radiuses of the calculated distances from the base stations receiving the location signal. Therefore, location detection of a mobile terminal in a wide area of the mobile radio communication system can be achieved.

Further, storing the locations of the mobile terminal detected at the predetermined intervals, the movement of the mobile terminal can be traced in the mobile communication system.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
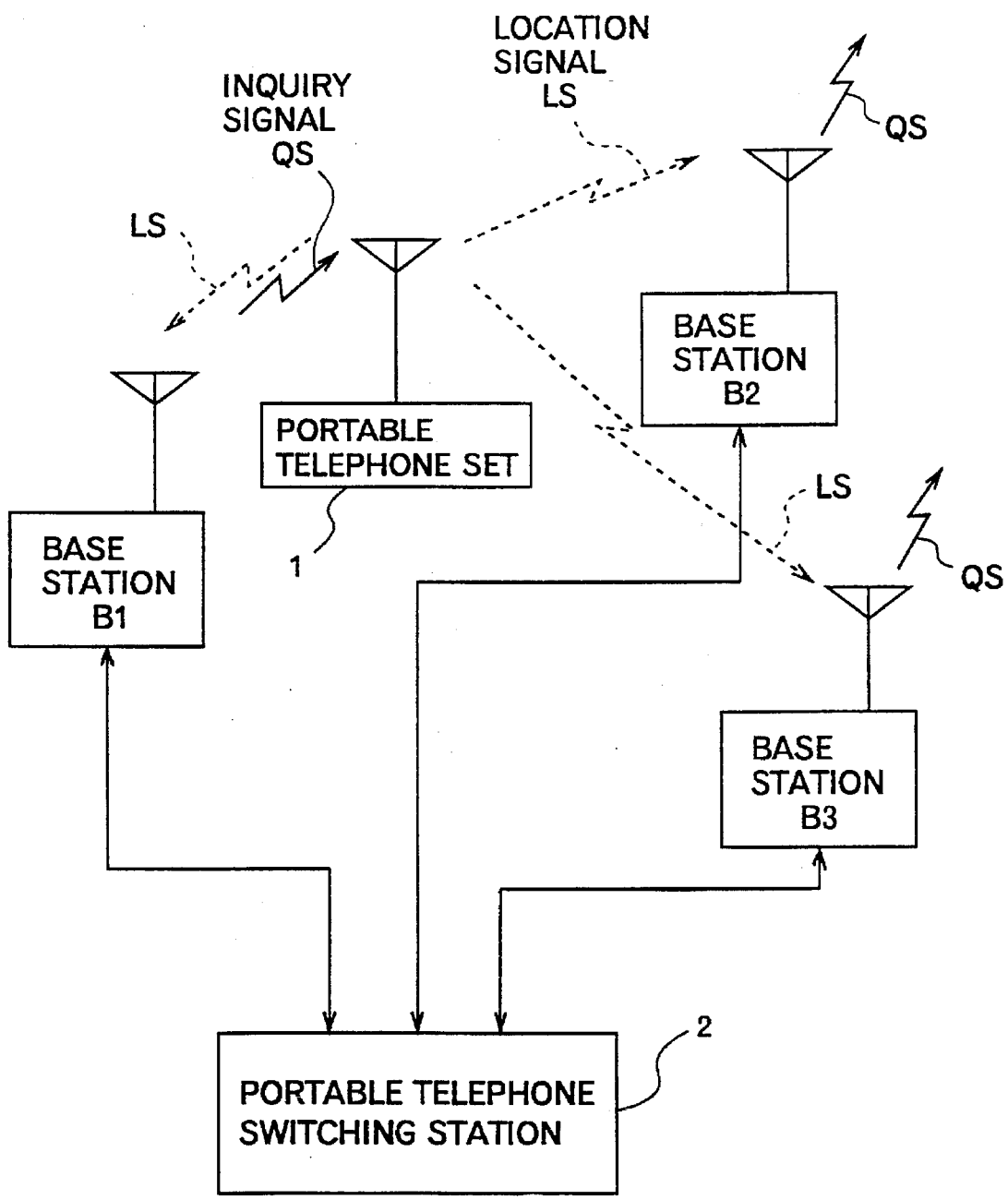
FIG. 1 is a schematic diagram showing a portable telephone system for explaining an embodiment of the present invention.

Referring to FIG. 1, a mobile communications system according to an embodiment of the present invention is comprised of a portable telephone set 1 as a mobile terminal and a plurality of base stations B1–B3. The base stations B1–B3, each forming a predetermined radio zone, or a cell, are connected to a portable telephone switching station 2. When the portable telephone set 1 exists within a certain zone, a communication line is established on demand and held until no longer required through the base station forming that zone and the portable telephone switching station 2.

The portable telephone set 1 transmits a radio signal LS in response to an inquiry signal QS received from the base stations. Since a signal LS is used for location detection, the signal LS is hereinafter referred to as a location signal LS. A location signal LS includes at least the telephone number assigned to that portable telephone set 1.

The location signal LS is received by the base stations B1, B2, and B3 neighboring to the portable telephone set 1. Here, the portable telephone set 1 is located within the cell formed by the base station B1. The location of the portable telephone set 1 is detected in the portable telephone switching station 2, as will be described later.

Figure 2:
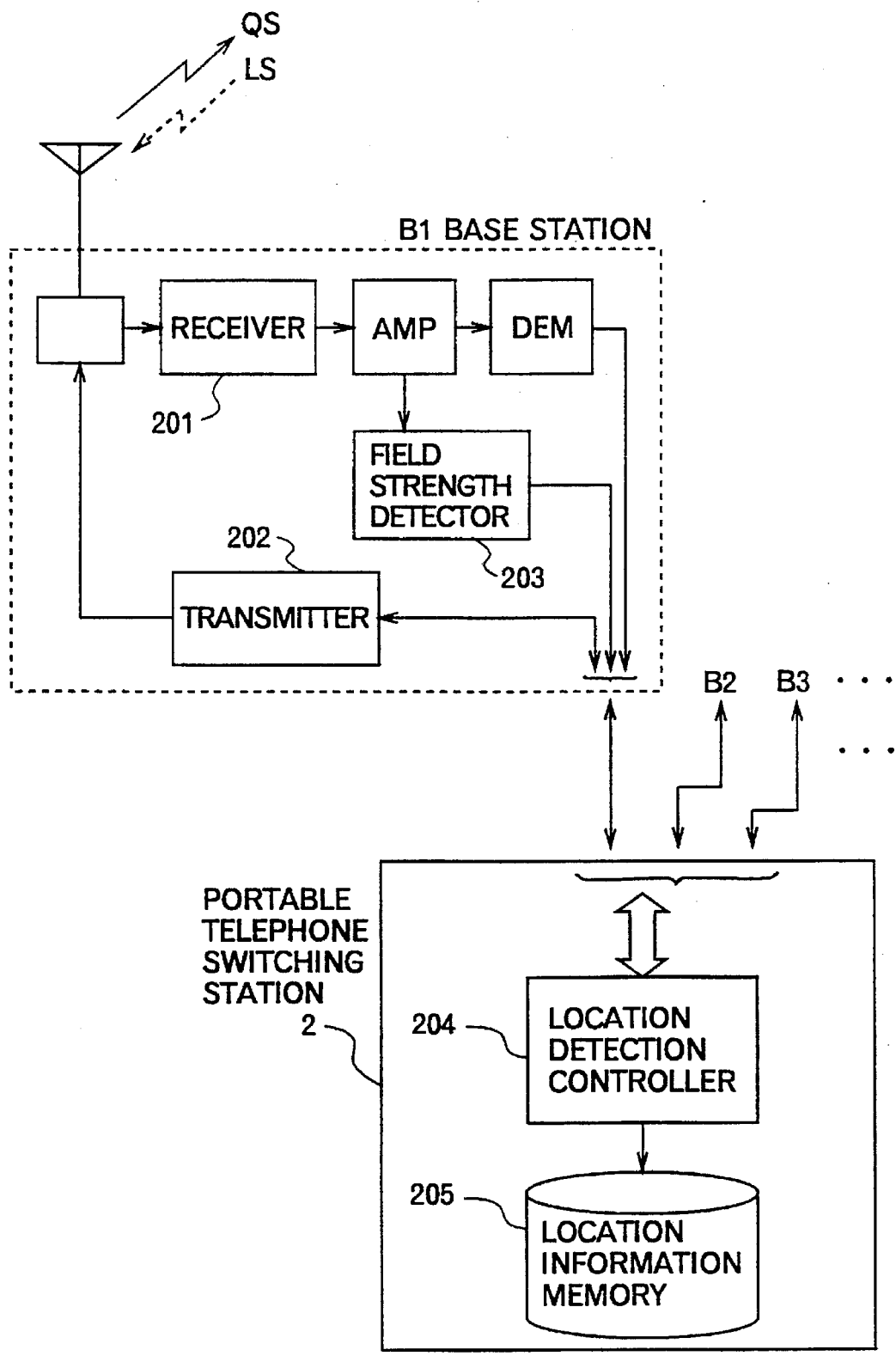
FIG. 2 is a detailed block diagram showing a base station and a portable telephone switching station of FIG. 1.

FIG. 2 schematically shows a functional block configuration of a base station and a portable telephone switching station in FIG. 1. The base station is comprised of a receiver 201, a transmitter 202, a field strength detector 203, and other necessary circuits. The portable telephone switching station 2 is comprised of a location detection controller 204, a location information memory 205, and other circuits for switching (not shown).

The inquiry signal QS is transmitted from the transmitter 202 to the portable telephone set 1, and then the location signal LS is received by the receiver 201. On receipt of the location signal LS, the field strength detector 203 detects the field strength of the received location signal LS. Since the base stations B1–B3 have the same function, the respective base stations obtain the field strength values of the location signal LS varying with distance.

The portable telephone switching station 2 causes the base stations B1–B3 to transmit the location inquiry signal QS according to a predetermined control sequence performed by the location detection controller 204. In response to this inquiry signal QS, the portable telephone set 1 emits the location signal LS which is received by the respective base stations in the vicinity of the portable telephone set 1.

Each base station transfers the information (telephone number, etc.) of the location signal LS and the detected field strength to the location detection controller 204 of the portable telephone switching station 2, in which the location of the portable telephone set 1 is calculated. Such a sequence from transmission of the inquiry signal QS to location specification is done at predetermined intervals. This allows the movement of the portable telephone set 1 to be traced.

Figure 3:
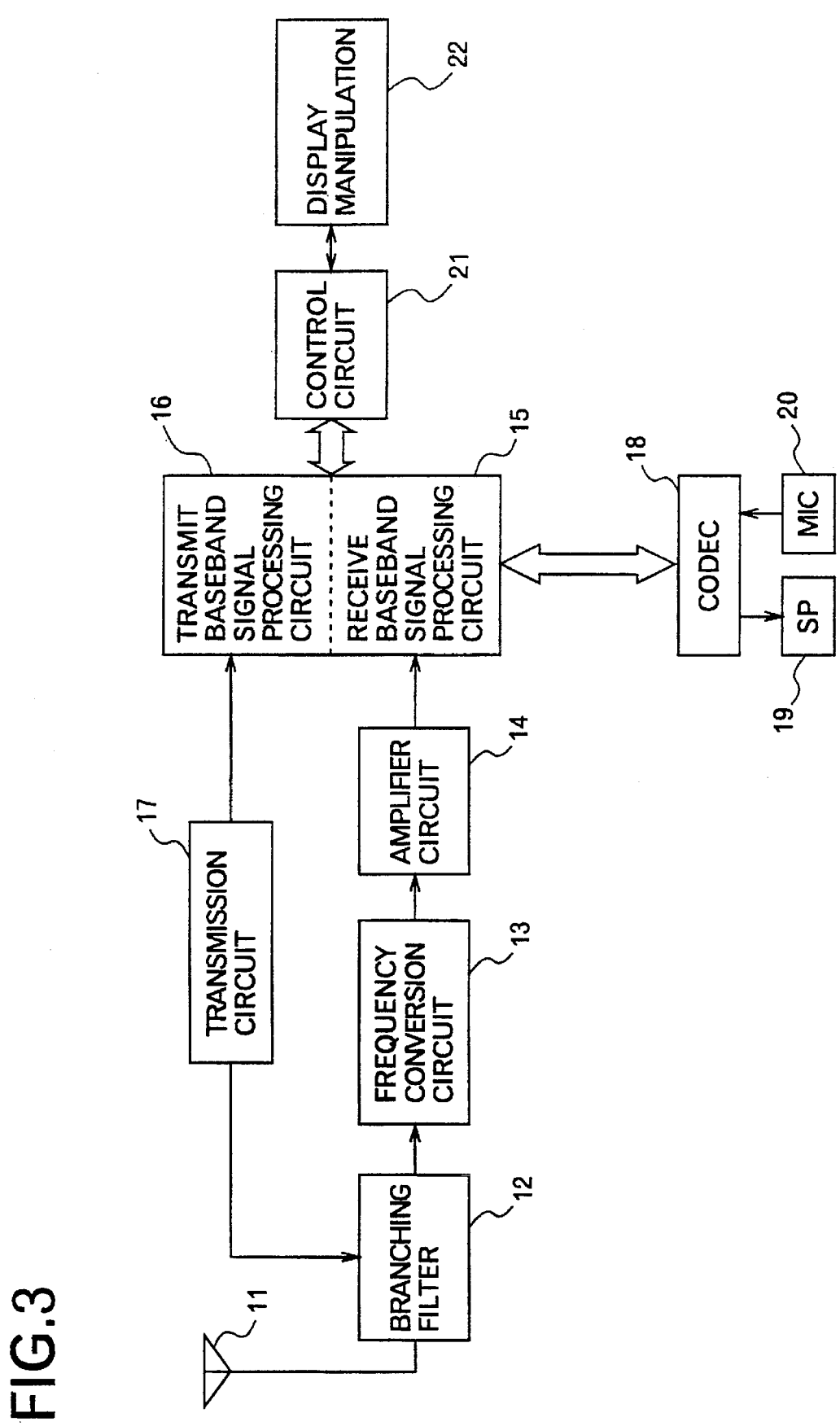
FIG. 3 is a block diagram showing a circuit of a portable telephone set of FIG. 1.

FIG. 3 is a block diagram showing the structure of the portable telephone set in FIG. 1. A quasi-microwave signal received by means of a non-directional antenna 11 is input to a frequency conversion circuit 13 through a branching filter 12. In the frequency conversion circuit 13, the received wave is converted to a baseband signal. The baseband signal is amplified by an amplifier circuit 14 and is input to a receive baseband signal processing circuit 15. On the other hand, a signal to be transmitted is transferred from a transmit baseband signal processing circuit 16 to a transmitter circuit 17 and is emitted through the branching filter 12.

A received baseband signal is decoded by a CODEC (coder-decoder) 18, and then the decoded signal is output to a speaker 19. A voice signal of a microphone 20 is coded by the CODEC 18, and then the coded signal is modulated and emitted by the transmit baseband signal processing circuit 16 and the transmitter circuit 17. The receive baseband signal processing circuit 15, the transmit baseband signal processing circuit 16, and display manipulation 22 comprising a dial and a liquid crystal panel are controlled by a control circuit 21.

When the inquiry signal QS is received from the base stations by the portable telephone set 1, the control circuit 21, responding to the inquiry signal QS, controls the transmit baseband signal processing circuit 16 to transmit the location detection signal LS including the identification number from the antenna 11 to the base stations B1–B3 existing near the portable telephone set 1.

Figure 4:
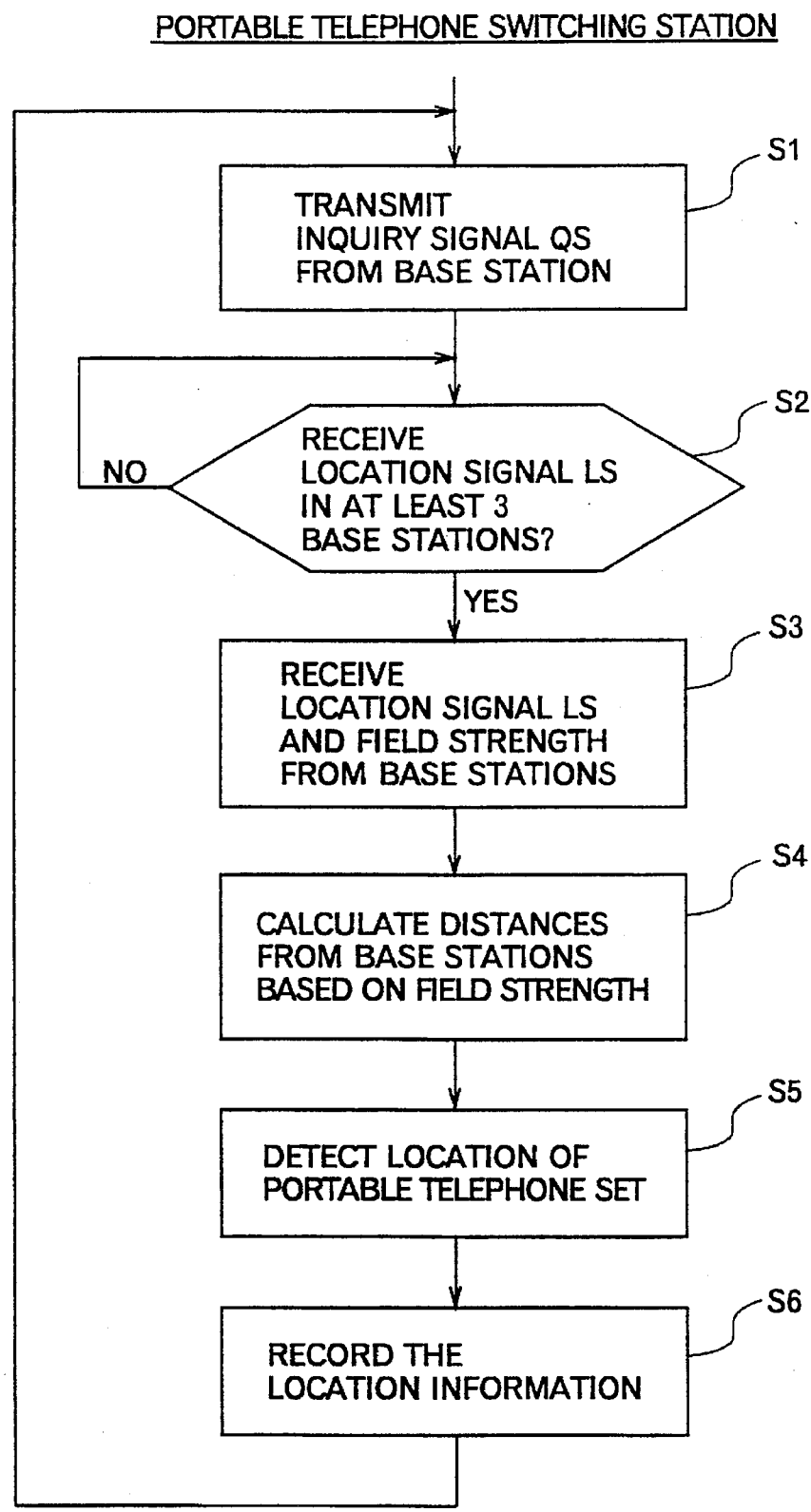
FIG. 4 is a flowchart showing how the location of a portable telephone set is detected in accordance with the embodiment of the present invention.

As shown in FIG. 4, the location of the portable telephone set 1 is detected and recorded. Assuming now that the portable telephone set 1 is located within the cell formed by the base station B1 and that the base stations B2 and B3 are adjacent to the base station B1 to surround the portable telephone set 1.

In step S1 of FIG. 4, the portable telephone switching station 2 operates the respective base stations B1–B3 to emit an inquiry signal QS. If the cell in which the portable telephone set 1 exists has been specified, the signal QS may be transmitted from only the base station forming that cell.

In response to the signal QS, the portable telephone set 1 transmits the location signal LS comprising here its own telephone number. This location signal LS is received by the base station B1 in the cell where the portable telephone set 1 is located, and is also received by the base stations B2 and B3 in neighboring cells. The respective base stations that have received the location signal LS detects the received field strength values as described above, and informs the portable telephone switching station 2 about reception of the location signal LS.

If the portable telephone switching station 2 receives that notice from at least three base stations (YES of step S2), the portable telephone switching station 2 receives the location signal LS (the telephone number) and the detected field strength values from the respective base stations that have received the location signal LS (step S3).

The location detection controller 204 of the portable telephone switching station 2 identifies the portable telephone set 1 by using the received location signal LS, that is, the telephone number, and calculates the respective distances between the portable telephone set 1 and the base stations B1–B3 using the received field strength values (step S4).

The location of the portable telephone set 1 is detected based on the calculated distances. More specifically, the location is found at the place where three or more circles meet, the respective circles having radiuses of the calculated distances (step S5). Given at least three circles, the location of the portable telephone set 1 can be specified (see FIG. 5).

After the location of the portable telephone set 1 has been detected, the location is recorded in the location information memory 205 of the portable telephone switching station 2 (step S6). Then, returning to step S1, the subsequent location inquiry signal QS is transmitted. In this case, since the portable telephone set 1 has been found within the cell of the base station B1, the location inquiry signal QS may be transmitted from only the base station B1. In the same manner, the location of the portable telephone set 1 can be detected successively at predetermined intervals and recorded in the location information memory 205, so that the location of the mobile terminal 1 can be traced.

Figure 5:
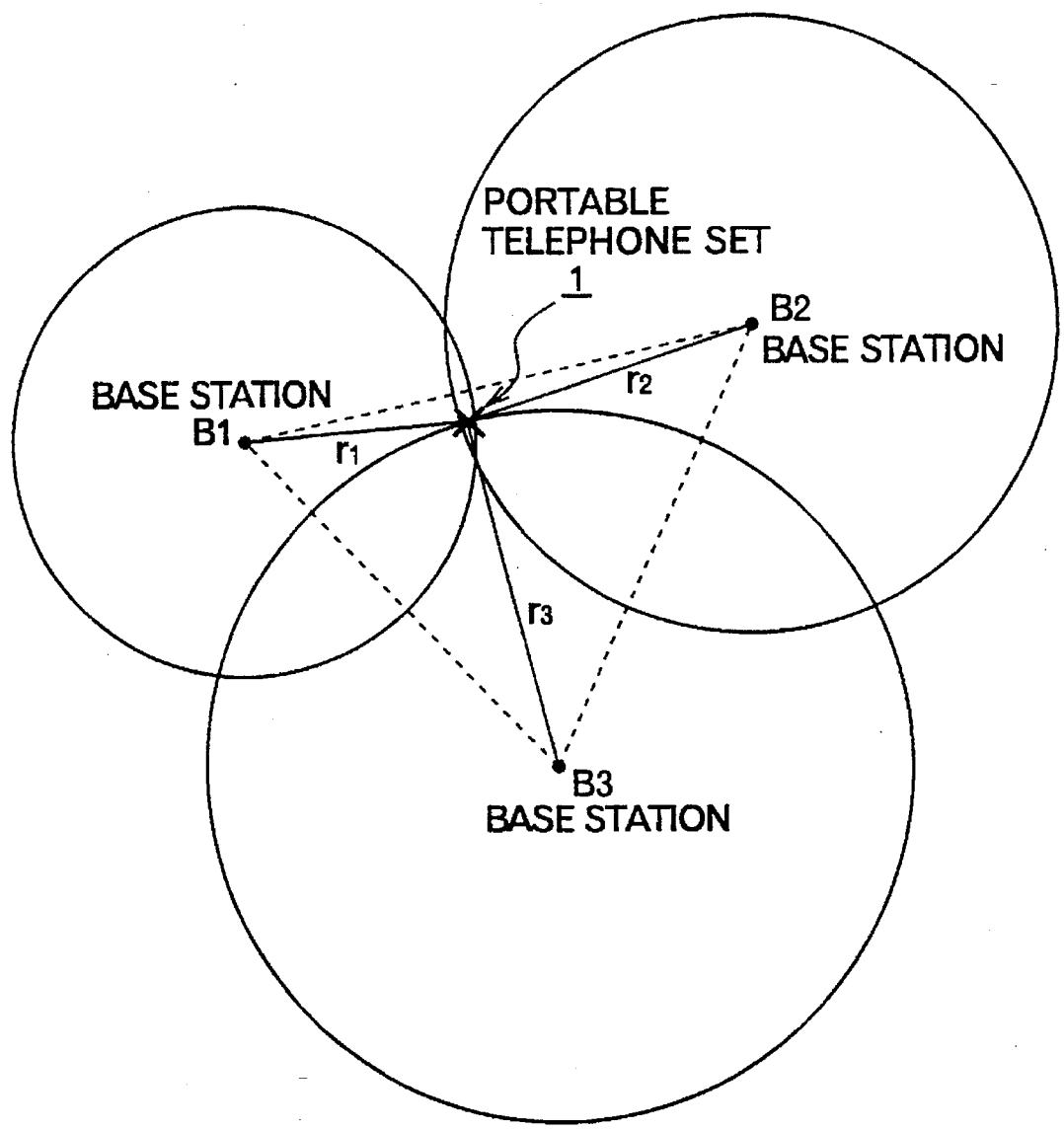
FIG. 5 is a schematic diagram explaining a location detection method according to the embodiment of the present invention.

As illustrated in FIG. 5, the location of the portable telephone set 1 can be determined. When three base stations B1–B3 detect the respective field strength values of a location signal LS, the location detection controller 204 calculates the respective distances $r_1$–$r_3$ and decides that the mobile terminal 1 is located at the intersection of three circles defined by the distances $r_1$–$r_3$.

As described above, in the location detection according to the present invention, a location inquiry signal is transmitted from one or more base stations to the mobile terminal at predetermined intervals. In response to the location inquiry signal, the mobile terminal emits a location signal which is in turn received by at least three base stations in the neighborhood of the mobile terminal. The respective distances from that base stations to the mobile terminal are calculated based on the respective field strength values of the location signal received by the base stations, and the location of the mobile terminal is detected based on the calculated distances. Therefore, location detection of a mobile terminal can be achieved in a wide area of the mobile communication system Further, storing the locations of the mobile terminal detected at the predetermined intervals, the movement of the mobile terminal can be traced in the mobile communication system. For example, even if the mobile terminal was stolen, it would be traced in a wide range and its location could be specified.

While the subject invention has been described with relation to the preferred embodiments, various modifications and adaptations thereof will now be apparent to those skilled in the art. All such modifications and adaptations as fall within the scope of the appended claims are intended to be covered thereby.

I claim:

1. A method for detecting the location of a mobile terminal in a mobile radio communication system including a plurality of base stations and a plurality of mobile terminals, the method comprising the steps of:

emitting a location inquiry signal from at least one of the base stations through a control channel which is used to transmit the location inquiry signal;

emitting a location signal from each of the mobile terminals receiving the location inquiry signal from the at least one base station, the location signal including identification information of each of the mobile terminals;

receiving the location signal from each of the mobile terminals in at least three base stations neighboring each of the mobile terminals;

calculating the respective distances from the base stations receiving the location signal of a specified mobile terminal, based on the respective field strength values detected from the received location signal, the specified mobile terminal being identified by the identification information included in the location signal; and calculating the location of the specified mobile terminal among the base stations receiving the location signal of the specified mobile terminal, based on the respective distances from the base stations receiving the location signal to the specified mobile terminal.

2. The method as set forth in claim 1, wherein the location of the specified mobile terminal is calculated as an intersection of the respective circles defined by radiuses of the calculated distances from the base stations receiving the location signal.

3. The method as set forth in claim 1, wherein the mobile radio communication system comprises a portable telephone system comprising a plurality of base stations and a plurality of switching stations, each of the base stations comprising a field strength detector, and each of the switching stations comprising a location detection controller, and the specified mobile terminal comprises a portable telephone set.

4. The method as set forth in claim 3, wherein the detected field strength values are transferred from the base stations receiving the location signal to a switching station connected to that base stations, the switching station calculating the respective distances based on the respective field strength values, and calculating the location of the portable telephone set among the base stations receiving the location signal, based on the respective distances from the base stations receiving the location signal to the portable telephone set.

5. A method for detecting the location of a mobile terminal in a mobile radio communication system including a plurality of base stations and a plurality of mobile terminals, the method comprising the steps of:

emitting a location inquiry signal from at least one of the base stations at predetermined intervals through a control channel which is used to transmit the location inquiry signal;

emitting a location signal from each of the mobile terminals receiving the location inquiry signal from the at least one base station, the location signal including identification information of each of the mobile terminals;

receiving a location signal from each of the mobile terminals in at least three base stations neighboring each of the mobile terminals;

calculating the respective distances from the base stations receiving the location signal to a specified mobile terminal, based on the respective field strength values detected from the received location signal at the predetermined intervals, the specified mobile terminal being identified based on the identification information included in the location signal;

calculating the location of the specified mobile terminal among the base stations receiving the location signal of the specified mobile terminal, based on the respective distances from the base stations receiving the location signal to the specified mobile terminal at the predetermined intervals; and storing the locations of the specified mobile terminal at the predetermined intervals.

6. The method as set forth in claim 5, wherein the location of the specified mobile terminal is calculated as an intersection of the respective circles defined by radiuses of the calculated distances from the base stations receiving the location signal.

7. The method as set forth in claim 5, wherein the mobile radio communication system comprises a portable telephone system comprising a plurality of base stations and a plurality of switching stations, each of the base stations comprising a field strength detector, and each of the switching stations comprising a location detection controller, and the specified mobile terminal comprises a portable telephone set.

8. The method as set forth in claim 7, wherein the detected field strength values are transferred from the base stations receiving the location signal to a switching station connected to that base stations, the switching station calculating the respective distances based on the respective field strength values, and calculating the location of the portable telephone set among the base stations receiving the location signal, based on the respective distances from the base stations receiving the location signal to the portable telephone set.

* * * * *